US006696981B1

(12) United States Patent
Hashimoto (10) Patent No.: US 6,696,981 B1
(45) Date of Patent: Feb. 24, 2004

(54) APPARATUS FOR MANAGING ENTRY AND EXIT OF A SHARED VEHICLE

(75) Inventor: Hideki Hashimoto, Wako (JP)

(73) Assignee: Honda Giken Koyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/541,743

(22) Filed: Apr. 3, 2000

(30) Foreign Application Priority Data

Apr. 5, 1999 (JP) .......................................... 11-098218

(51) Int. Cl.[7] ............................................. G08G 1/123
(52) U.S. Cl. ..................... 340/988; 340/432.2; 340/933; 340/5.2; 340/5.42; 340/5.7; 705/5; 705/13; 235/384; 235/385
(58) Field of Search .............................. 340/988, 425.5, 340/426, 457, 5.7, 932.2, 933, 935, 937, 940, 941, 942, 943, 994, 5.42, 5.2; 705/5, 10, 13; 455/456; 701/200, 207, 117; 235/384, 375, 385; 194/211; 52/174; 414/227

(56) References Cited

U.S. PATENT DOCUMENTS

| | | | |
|---|---|---|---|
| 1,223,258 A | 4/1917 | Cooper | 224/42.38 |
| 3,624,608 A | 11/1971 | Altman et al. | 340/5.42 |
| 3,665,397 A | 5/1972 | Di Napoli et al. | 340/5.42 |
| 3,742,453 A | 6/1973 | Polylo | 255/382 |
| 3,754,122 A | 8/1973 | Di Napoli et al. | 377/24 |
| 3,757,290 A | 9/1973 | Ross | 340/991 |
| 3,858,775 A | 1/1975 | Haas | 224/520 |
| 3,906,447 A | 9/1975 | Crafton | 235/382.5 |
| 3,997,044 A | 12/1976 | Schasser | 194/211 |
| 4,072,859 A | 2/1978 | McWaters | 250/214 R |
| 4,353,055 A | 10/1982 | Kawakatsu et al. | 340/457 |
| 4,360,875 A | 11/1982 | Behnke | 455/456.5 |
| 4,438,426 A | 3/1984 | Adkins | 307/10.5 |
| 4,495,484 A | 1/1985 | Kawakatsu et al. | 340/457 |
| 4,620,429 A | 11/1986 | Quillen | 70/383 |
| 4,692,762 A | 9/1987 | Lewiner et al. | 340/825.69 |
| 4,719,460 A | 1/1988 | Takeuchi et al. | 340/5.62 |

(List continued on next page.)

FOREIGN PATENT DOCUMENTS

| | | |
|---|---|---|
| CA | 2 227 664 | 7/1998 |
| DE | 22 10 088 | 10/1972 |

(List continued on next page.)

OTHER PUBLICATIONS

Bill Donahue, May 17, 2002, Cars You Drive for Just a Little While Then It's Their Turn, New York Times, Coast), p. 10.
Matthew Barth; Aug. 1999, Stimulation Model Performance Analysis of a Multiple Station Shared Vehicle System, Transportation Research, Issue 4 vol. 7c Abstract.

Primary Examiner—Benjamin C. Lee
(74) Attorney, Agent, or Firm—Manatt, Phelps & Phillips, LLP.

(57) ABSTRACT

The apparatus for managing the entry and exit of a shared vehicle, comprises: a vehicle position detector provided in the shared vehicle; a position determining device for determining whether the position of the shared vehicle is within an entrance area of a parking lot, based on the vehicle position information provided by the vehicle position detector; an arrival determining device for determining whether a main switch of the shared vehicle has been turned off within the entrance area; a return operation determining device for determining whether a user of the vehicle has conducted a return operation using a terminal for conducting rental and return operations; and a return determining device for confirming the return of the shared vehicle when the arrival determining device determines that the main switch has been turned off within the entrance area and when the return operation determining device determines that the return operation has been conducted.

35 Claims, 9 Drawing Sheets

U.S. PATENT DOCUMENTS

| | | | | |
|---|---|---|---|---|
| 4,776,003 A | | 10/1988 | Harris | 455/407 |
| 4,777,646 A | | 10/1988 | Harris | 455/407 |
| 4,965,821 A | * | 10/1990 | Bishop et al. | 455/409 |
| 4,994,714 A | | 2/1991 | Hoekman et al. | 315/80 |
| 5,066,034 A | | 11/1991 | Carr | 280/428 |
| 5,168,451 A | | 12/1992 | Bolger | 701/117 |
| 5,206,643 A | | 4/1993 | Eckelt | 340/932.2 |
| 5,265,006 A | | 11/1993 | Asthana et al. | 705/8 |
| 5,289,369 A | | 2/1994 | Hirshberg | 705/13 |
| 5,337,046 A | | 8/1994 | Graseet | 340/944 |
| 5,357,143 A | | 10/1994 | Lehr et al. | 307/10.1 |
| 5,366,338 A | | 11/1994 | Mortensen | 414/563 |
| 5,493,694 A | | 2/1996 | Vlcek et al. | 455/521 |
| 5,557,254 A | | 9/1996 | Johnson et al. | 340/426.19 |
| D374,208 S | | 10/1996 | Eva, Jr. | |
| 5,579,973 A | | 12/1996 | Taft | 224/509 |
| 5,604,676 A | | 2/1997 | Penzias | 705/417 |
| 5,612,608 A | | 3/1997 | Ishiguro et al. | 340/636.12 |
| 5,614,804 A | | 3/1997 | Kayano et al. | 320/134 |
| 5,631,947 A | * | 5/1997 | Wittstein et al. | 379/114.17 |
| 5,664,113 A | | 9/1997 | Worger et al. | 705/28 |
| 5,686,895 A | | 11/1997 | Nakai et al. | 340/636.1 |
| 5,717,387 A | | 2/1998 | Suman et al. | 701/36 |
| 5,721,550 A | | 2/1998 | Lopez | 341/176 |
| 5,726,885 A | | 3/1998 | Klein et al. | 455/456 |
| 5,737,710 A | | 4/1998 | Anthonyson | 701/1 |
| 5,751,973 A | | 4/1998 | Hassett | 705/13 |
| 5,790,976 A | | 8/1998 | Boll et al. | 455/456.5 |
| 5,803,215 A | | 9/1998 | Henze et al. | 191/2 |
| 5,812,070 A | | 9/1998 | Tagami et al. | 340/932.2 |
| 5,838,251 A | | 11/1998 | Brinkmeyer et al. | 340/5.22 |
| 5,869,950 A | | 2/1999 | Hoffman, Jr. et al. | 320/103 |
| 5,908,453 A | | 6/1999 | Tabata et al. | 701/22 |
| 5,922,040 A | | 7/1999 | Prabhakaran | 701/117 |
| 5,945,919 A | | 8/1999 | Trask | 340/825.49 |
| 5,995,013 A | | 11/1999 | Yoshizawa et al. | 340/5.23 |
| 5,995,898 A | | 11/1999 | Tuttle | 701/102 |
| 6,066,148 A | * | 12/1999 | Strong | 701/33 |
| 6,078,850 A | | 6/2000 | Kane et al. | 701/29 |
| 6,089,431 A | | 7/2000 | Heyworth | 224/521 |
| 6,129,371 A | | 10/2000 | Powell | 280/461.1 |
| 6,133,704 A | | 10/2000 | Kikuchi et al. | 320/104 |
| 6,154,006 A | | 11/2000 | Hatanaka et al. | 320/109 |
| 6,157,315 A | | 12/2000 | Kokubo et al. | 340/5.42 |
| 6,181,991 B1 | | 1/2001 | Kondo et al. | 701/22 |
| 6,185,487 B1 | | 2/2001 | Kondo et al. | 701/22 |
| 6,185,501 B1 | | 2/2001 | Smith et al. | 701/200 |
| 6,225,890 B1 | | 5/2001 | Murphy | 340/426.19 |
| 6,240,365 B1 | | 5/2001 | Bunn | 701/213 |
| 6,249,233 B1 | | 6/2001 | Rosenberg et al. | 340/932.2 |
| 6,253,129 B1 | | 6/2001 | Jenkins et al. | 701/24 |
| 6,253,980 B1 | | 7/2001 | Murakami et al. | 224/510 |
| 6,278,936 B1 | | 8/2001 | Jones | 701/201 |
| 6,304,223 B1 | | 10/2001 | Hilton et al. | 343/702 |
| 6,336,295 B1 | | 1/2002 | Takei et al. | 52/174 |
| 6,340,935 B1 | | 1/2002 | Hall | 360/932.2 |
| 6,427,913 B1 | | 8/2002 | Maloney | 235/383 |
| 6,317,720 B1 | | 11/2002 | Murakami et al. | 705/10 |
| 2003/0014302 A1 | | 1/2003 | Jablin | 705/13 |

FOREIGN PATENT DOCUMENTS

| | | |
|---|---|---|
| DE | 40 24 186 A1 | 2/1992 |
| DE | 40 32 198 A1 | 4/1992 |
| DE | 42 27 969 A1 | 3/1994 |
| DE | 43 01 039 A1 | 7/1994 |
| DE | 44 29 852 A1 | 2/1996 |
| DE | 195 08 369 C1 | 3/1996 |
| DE | 195 08 370 A1 | 9/1996 |
| DE | 195 21 902 A1 | 12/1996 |
| DE | 38 05 810 A1 | 9/1998 |
| DE | 197 28 885 A1 | 1/1999 |
| DE | 298 11 292 U1 | 1/1999 |
| DE | 197 40 602 A1 | 3/1999 |
| DE | 100 33 341 A1 | 1/2002 |
| EP | 0 147 284 B1 | 7/1985 |
| EP | 0 212 842 A1 | 3/1987 |
| EP | 0 323 326 B1 | 7/1989 |
| EP | 0 433 740 B1 | 6/1991 |
| EP | 0 451 482 A1 | 10/1991 |
| EP | 0 509 776 | 10/1992 |
| EP | 0 309 318 B1 | 12/1992 |
| EP | 0 307 485 B1 | 6/1994 |
| EP | 0 653 732 A1 | 5/1995 |
| EP | 0 694 885 A2 | 1/1996 |
| EP | 0 179 160 A1 | 4/1996 |
| EP | 0 708 427 A2 | 4/1996 |
| EP | 0 877 341 A2 | 11/1998 |
| EP | 0 991 031 A2 | 4/2000 |
| EP | 0 997 861 A2 | 5/2000 |
| EP | 1 011 085 A2 | 6/2000 |
| EP | 1 067 480 A2 | 1/2001 |
| EP | 1 067 481 A2 | 1/2001 |
| EP | 1 067 498 A1 | 1/2001 |
| FR | 2 232 064 | 12/1974 |
| FR | 2 212 064 | 7/1979 |
| FR | 2 535 491 | 5/1984 |
| FR | 2 625 954 | 7/1989 |
| FR | 2 656 450 | 6/1991 |
| FR | 2 662 285 | 11/1991 |
| FR | 2 612 319 | 5/1992 |
| FR | 2 692 064 | 12/1993 |
| FR | 2 712 715 | 5/1995 |
| FR | 2 732 144 | 9/1996 |
| FR | 2 126 602 | 6/1997 |
| GB | 2 146 154 A | 4/1985 |
| GB | 2 271 081 A | 10/1989 |
| GB | 2 291 235 A | 2/1996 |
| JP | 11-127750 | 3/1973 |
| JP | 4-133195 | 5/1992 |
| JP | 5-133195 | 5/1993 |
| JP | 8-138199 | 5/1996 |
| JP | 10-208195 | 8/1998 |
| JP | 10-255162 | 9/1998 |
| JP | 10-255191 | 9/1998 |
| JP | 10-261199 | 9/1998 |
| JP | 10-266191 | 9/1998 |
| JP | 11-127788 | 5/1999 |
| JP | 11-201762 | 7/1999 |
| JP | 2001 067581 A | 3/2001 |
| JP | 2001-67581 | 3/2003 |
| WO | WO 84/03785 | 9/1984 |
| WO | WO 85/01812 | 4/1985 |
| WO | WO 92/22043 | 12/1992 |
| WO | WO 95/21435 | 8/1995 |
| WO | WO 99/44186 | 9/1999 |

* cited by examiner

APPARATUS FOR MANAGING ENTRY AND EXIT OF A SHARED VEHICLE

BACKGROUND OF THE INVENTION

1. Field of the Invention

The present invention relates to an apparatus for managing the entry and exit of a shared vehicle.

This application is based on Japanese Patent Application No. Hei 11-98218, the contents of which are incorporated herein by reference.

2. Description of the Related Art

There are parking lots around mass transit stations and in growing urban areas. Users park their vehicles in the parking lots for shopping, and, after finishing the shopping, drive out of the parking lots. When entering a parking lot, a user who is going to use the parking lot stops the vehicle in front of an entrance gate, performs an entry operation, e.g., receiving a ticket for the parking lot, opening the entrance gate, and parks the vehicle in a parking space. When leaving the parking lot, the user drives the vehicle from the parking space, stops in front of the exit gate, opens the exit gate, and then leaves the parking lot.

Recently, environmental issues have become highlighted, and to improve air pollution and traffic congestion, techniques have been proposed for using shared vehicles in a specified region. The techniques for using the shared vehicles require parking lots (ports) for renting and returning the shared vehicles. The ports for the shared vehicles should be conveniently provided where there are a number of users who are to use the shared vehicles, e.g., in parking lots in front of stations, in densely built-up regions, or near department stores and shopping centers. The ports dedicated to the shared vehicles may be provided independently, or may be provided as a part (block) of the existing parking lots to reduce the costs of land purchases and construction.

When the vehicle is a general vehicle (which includes all vehicles which are not shared), because the vehicle is owned by a user, the owner parks his vehicle in parking lots to avoid violating parking regulations, returns to the vehicle in the parking lot after shopping, and leaves the parking lots. When the vehicle is a shared vehicle, the user may leave the vehicle outside of the parking lot.

In contrast with the general vehicle, because the shared vehicle, which was returned to the port, may be immediately rented, few shared vehicles may be rentable during specified hours. Therefore, when users leave the vehicle outside the port, the problem arises that the number of the rentable shared vehicles may be further reduced. As the number of shared vehicles which users leave outside parking lots increases, the vacated vehicles may cause traffic jam, and decreases the efficiency in the use of the shard vehicles.

Further, since the shared vehicles is not widespread, parking spaces for general vehicles may decrease when the parking lots dedicated to the shared vehicles are provided in existing parking lots. Moreover, when the shared vehicles and the general vehicles are parked in the same area, the procedures for renting and returning the shared vehicles become troublesome.

BRIEF SUMMARY OF THE INVENTION

It is therefore an object of the present invention to provide an apparatus for managing the entry and exit of a shared vehicle which ensures the efficiency of the use of the entire parking lot by providing a shared vehicle area within a parking lot for general vehicles, allows the parking of the shared vehicles and the general vehicles in a mixed manner, and can accurately conduct procedures for renting and returning the shared vehicle.

In a first aspect of the present invention, the apparatus for managing the entry and exit of a shared vehicle (V), comprises: a vehicle position detector provided in the shared vehicle; a position determining device for determining whether the position of the shared vehicle is within an entrance area of a parking lot, based on the vehicle position information provided by the vehicle position detector; an arrival determining device for determining whether a main switch (M) of the shared vehicle has been turned off within the entrance area; a return operation determining device for determining whether a user of the vehicle has conducted a return operation using a terminal for conducting rental and return operations; and a return determining device for confirming the return of the shared vehicle when the arrival determining device determines that the main switch has been turned off within the entrance area and when the return operation determining device determines that the return operation has been conducted.

When the vehicle position detector determines that the shared vehicle is within the entrance area, when the arrival determining device determines that the main switch of the vehicle has been turned off, and when the return operation determining device determines that the user has conducted the return operation using the terminal, the return of the shared vehicle is confirmed.

According to the first aspect of the present invention, the returning process for the shared vehicle is not completed unless the user has conducted the returning procedure for the shared vehicle. Therefore, when the user leaves the vehicle outside a parking lot and only conducts the return operation, the shared vehicle has not been returned. This prevents the shared vehicle from being left outside the parking lot. Further, because it is determined, based on the vehicle position, whether the vehicle is within the parking lot, general vehicles do not affect the management of the shared vehicles, a shared vehicle area can be provided in the parking lot for the general vehicles, and the general vehicles and the shared vehicles can be parked in a mixed manner.

In a second aspect of the present invention, an apparatus for managing the entry and exit of a shared vehicle, comprises: a vehicle position detector provided in the shared vehicle; a position determining device for determining whether the position of the shared vehicle is within an entrance area of a parking lot or within an exit area of the parking lot, based on the vehicle position information provided by the vehicle position detector; an arrival determining device for determining whether a main switch of the shared vehicle has been turned off within the entrance area; a departure determining device for determining whether the shared vehicle has gone out of the exit area; a return operation determining device for determining whether a user of the vehicle has conducted a return operation using a terminal for conducting rental and return operations; a rental operation determining device for determining whether the user has conducted a rental operation using the terminal; a return determining device for confirming the return of the shared vehicle when the arrival determining device determines that the main switch has been turned off within the entrance area and when the return operation determining device determines that the return operation has been conducted; and a rental determining device for accepting rental of the shared vehicle when the departure determining device determines that the shared vehicle drives out of the exit area and when the rental operation determining device determines that the rental operation has been conducted.

Based on the vehicle position information provided by the vehicle position detector, the position determining device determines whether the position of the shared vehicle is within an entrance area of a parking lot or within an exit area of the parking lot. Only when the vehicle is within the entrance area, if the arrival determining device determines that the main switch of the vehicle has been turned off, and when the return operation determining device determines that the user has conducted the return operation using the terminal, the return of the shared vehicle is confirmed. On the other hand, only when the vehicle position detector detects that the vehicle is within the exit area, when the departure determining device determines that the shared vehicle drives out of the exit area, and when the rental operation determining device determines that the user has conducted the rental operation using the terminal, the rental of the shared vehicle is confirmed.

According to the second aspect of the invention, the returning process for the shared vehicle is not completed unless the user has conducted the return procedure for the shared vehicle. Therefore, when the user leaves the vehicle outside a parking lot and only conducts the return operation, the shared vehicle has not been returned. This prevents the shared vehicle from being left outside the parking lot. Further, the shared vehicle cannot be rented until the user has conducted the rental procedure. Therefore, the rental and return of the shared vehicle can be reliably managed in the parking lot. Further, because it is determined, based on the vehicle position, whether the vehicle is within the parking lot, general vehicles do not affect the management of the shared vehicles, a shared vehicle area can be provided in the parking lot for general vehicles, and the general vehicles and the shared vehicles can be parked in a mixed manner.

In a third aspect of the invention, the apparatus for managing the entry and exit of a shared vehicle, comprises a shared vehicle, and a control device. The shared vehicle comprises: a vehicle position detector; an area storage device (port area data D1 for determining the entry of the vehicle, and port area data exit of the vehicle) for storing an entrance area and an exit area of a parking lot; an approach notifying device for notifying the control device through a communicator (transmitter 411) that the shared vehicle is entering into the entrance area; a departure notifying device for notifying the control device through the communicator that the shared vehicle drives out of the exit area; and an arrival notifying device for notifying the control device via the communicator that a main switch of the shared vehicle has been turned off within the entrance area. The control device comprises: a terminal for conducting rental and return operations for the shared vehicle; a communicator for receiving the approach notification, the departure notification, and the arrival notification; a storage device (parking information storage device) for storing the parking information of the shared vehicle; a parking information updating device for updating the parking information, based on the approach notification, the departure notification, the arrival notification, and the rental and return operations; and a controller for controlling rental and return of the shared vehicle, based on the updated parking information.

Based on the vehicle position information provided by the vehicle position detector, and on the information of the entrance area and the exit area stored in the area storage device, the approach notifying device notifies the control device of the departure when the shared vehicle is entering the entrance area, the departure notifying device notifies the control device of the departure when the shared vehicle leaves the exit area, and the arrival notifying device notifies the control device of the arrival when the main switch of the shared vehicle has been turned off.

On the other hand, in the control device, the communicator receives the approach notification, the departure notification, and the arrival notification. The storage device stores the parking information of the shared vehicle. Then, the parking information updating device updates the parking information, based on the approach notification, the departure notification, the arrival notification, and the rental and return operations using the terminal, and the rental or returning of the shared vehicle are controlled based on the updated parking information.

According to the third aspect of the invention, the returning and rental processes are not completed unless the user has conducted the specified procedures when going into or out of the parking lot. Therefore, the shared vehicle can be reliably managed. The situation of the parked vehicles in the parking lot can be obtained by communication between the shared vehicle and the control device, and the parking information update device of the control device always provides the latest parking information. Thus, the entry and exit of the shared vehicles can be securely managed.

When the user leaves the vehicle outside a parking lot and only conducts the return operation, the shared vehicle has not been returned. This prevents the shared vehicle from being left outside the parking lot. Further, because the general vehicles do not affect the management of the shared vehicles, a shared vehicle area can be provided in the parking lot for the general vehicles, and the general vehicles and the shared vehicles can be parked in a mixed manner.

In a fourth aspect of the invention, the apparatus for managing the entry and exit of a shared vehicle, comprises a shared vehicle and a control device. The shared vehicle comprises a vehicle position detector, and a communicator for sending vehicle position information provided by the vehicle position detector and ON/OFF information of the main switch of the shared vehicle to the control device. The control device comprises: a terminal for conducting rental and return operations for the shared vehicle; an area storage device for storing an entrance area and an exit area of a parking lot; a parking information storage device for storing parking information of the shared vehicle based on the vehicle position information and the ON/OFF information of the main switch, which are sent from the vehicle, and on the information from the area storage device; a parking information updating device for updating the parking information based on the rental and return operations using the terminal; and a controller for controlling rental and returning of the vehicle, based on the updated parking information.

According to the fourth aspect of the invention, the returning and rental processes are not completed unless the user has conducted the specified procedures when going into or out of the parking lot. Therefore, the shared vehicle can be reliably managed. The situation of the parked vehicles in the parking lot can be obtained by the communication between the shared vehicle and the control device, and the parking information update device of the control device always provides the latest parking information. Thus, the entry and exit of the shared vehicles can be securely managed.

When the user leaves the vehicle outside a parking lot and only conducts the return operation, the shared vehicle has not been returned. This prevents the shared vehicle from being left outside the parking lot. Further, because the general vehicles do not affect the management of the shared vehicles, a shared vehicle area can be provided in the parking lot for the general vehicles, and the general vehicles and the shared vehicles can be parked in a mixed manner. When the control device has the function for determining the entrance and exit areas, the labor to input the data into the respective shared vehicles can be reduced.

DETAILED DESCRIPTION OF THE INVENTION

Figure 1:
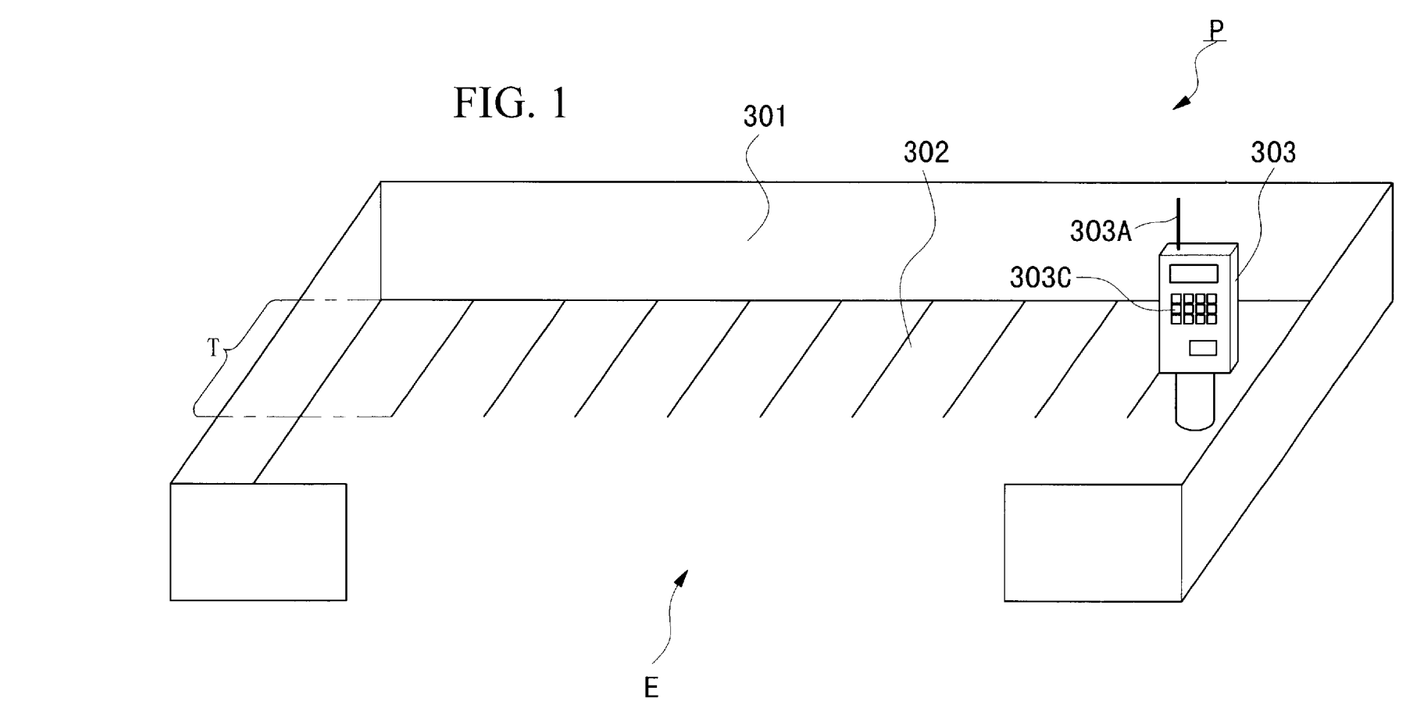
FIG. 1 is a perspective view showing a port in accordance with the present invention.
Figure 2:
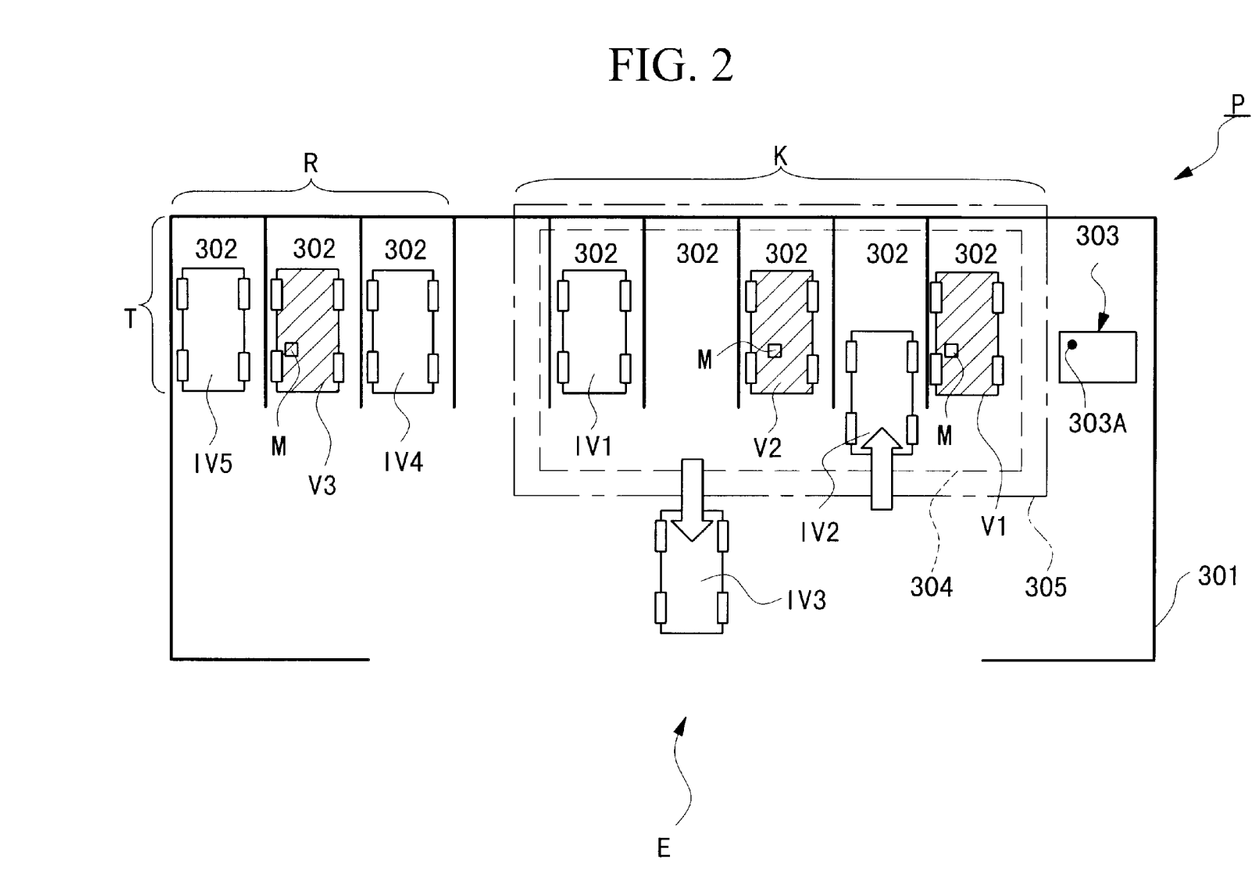
FIG. 2 is a top view of the port shown in FIG. 1.

In FIGS. 1 and 2, reference character P denotes a port which is unattended and provided, e.g., in front of a station. The port P is enclosed with walls 301, except at an entrance E, thus preventing trespassing onto this area.

The port P includes a parking space T which is divided into a plurality of blocks 302, and which is opened through the entrance E. The entrance E does not need to have gate. The walls 301 are not always needed. By way of example, the parking space T includes eight blocks 302 as shown in FIG. 2. Out of these blocks 302, five blocks are defined as a shard vehicle area K for managing shared vehicles V. The remaining three blocks are defined as a general vehicle area R in which the shard vehicles V cannot be rented and returned. Preferably, the shard vehicles are electric vehicles.

The general vehicle area R may be used by a user of the shared vehicle V when the user has the intention of continuously using the shared vehicle. Therefore, another user cannot use this shared vehicle, which is thus handled differently from returned vehicles.

The number of the blocks 302 may be freely changed, and the manner of dividing the blocks 302 into the shared vehicle area K and the general vehicle area R may be also changed. Preferably, in a large parking lot of a department store which can accommodate a hundred or several hundreds of vehicles, because the shared vehicle system is not spread, a large number of parking blocks are assigned to the general vehicle area R, while a small number of the parking blocks (e.g., for several or several tens of vehicles) are assigned to the shared vehicle area K. In this case, the port P simply occupies a small area of the parking lots.

In the case of the general vehicle IV, when using the parking lot of the department store for shopping, the user parks the vehicle in the general vehicle area R, finishes shopping, and then leaves the parking lot for the next destination such as his home. In the case of the shared vehicle V, the user parks the shared vehicle V in any block in the general vehicle area R in a manner similar to the case of the general vehicle IV. In this case, the parked shared vehicle V is not returned (is reserved), that is, is still rented even after the shopping, so that the user can use the shared vehicle for the next scheduled event.

Therefore, the user can use the parking lot whether the vehicle is a general vehicle IV or a shared vehicle V. Basically, the general vehicles IV are parked in the general vehicle area R, so that the shared vehicles V take precedence over the general vehicles in the shared vehicle area K. When the general vehicle area R is full of the vehicles, the general vehicles IV may be parked in the shared vehicle area K which is not fully occupied because there is no partition between the area R and K. Thus, the parking capacity for the general vehicles IV is not restricted by the shared vehicle area K.

FIG. 2 shows the situation in which the general vehicles IV and the shared vehicles V are parked in both the shared vehicle area K and the general vehicle area R. In this figure, the shared vehicles V are hatched, while the general vehicles IV are not hatched. In blocks 302 of the shared vehicle area K, two shared vehicles V1 and V2 and one general vehicle IV1 are parked, another general vehicle IV2 just reaches and enters the entrance area 304, and another general vehicle IV3 just drives out of the exit area 305.

In blocks 302 of the general vehicle area R, two general vehicles IV4 and IV5 and one shared vehicle V3 are parked. In FIG. 2, the entrance area 304 corresponds to the area enclosed by the dashed line, and the exit area 305 corresponds to the area which is enclosed by the chain line and which is larger than the entrance area 304.

A control device 303 is provided next to the shared vehicle area K. This control device 303 reads a dedicated card (e.g., an IC card) inserted by a vehicle user, checks the personal code number, and conducts a procedure for renting and returning the shared vehicle V. The control device 303 includes a terminal 303C with a key board, and a display. The shared vehicle V can be locked, unlocked, started, and driven by the dedicated card or a shared key. Reference character 303A denotes an antenna of the control device.

When information processed by the control device 303 is increased so that an additional computer is necessary, the control device 303 may transfer the control function to another device, and the port P may have only the terminal function (or a communication function).

To divide the shared vehicle area K into the blocks 302 (to enable identification of the blocks), marks are drawn on the ground (paved surface) with paint, or only guide signs may be installed. That is, the shared vehicle area K need not be enclosed by structures (e.g., fences), and a special device (e.g., for preventing vehicles other than the shared vehicles from entering) is not necessary. Because this invention requires only the control device 303 for renting/returning vehicles, the shared vehicle area K can be provided in an existing parking lot (of, e.g., a department store) with the reduced costs.

Only when the user wishes to return the shared vehicle V to this port P, the user parks the vehicle in the shared vehicle area K, and performs a predetermined procedure for returning the vehicle (which will be described later), at which point the returning process is completed. Accordingly, rentable shared vehicles V always park in the shared vehicle area K. Because the area for renting and returning the shared vehicle V is thus restricted to a part of the parking lot, a user who is going to rent the shared vehicle V need not search a large parking lot, and can easily confirm the standby shared vehicle V and can follow the procedure for renting the shared vehicle V.

In FIG. 2, reference character M denotes a main switch, which is provided in a driver's seat in the shared vehicle V and is operated by the user. In the case of a gasoline vehicle, the main switch corresponds to an ignition switch which is rotated by an ignition key. When the shared vehicle V is an electric vehicle, the main switch is a simple switch which does not require a key.

Figure 3:
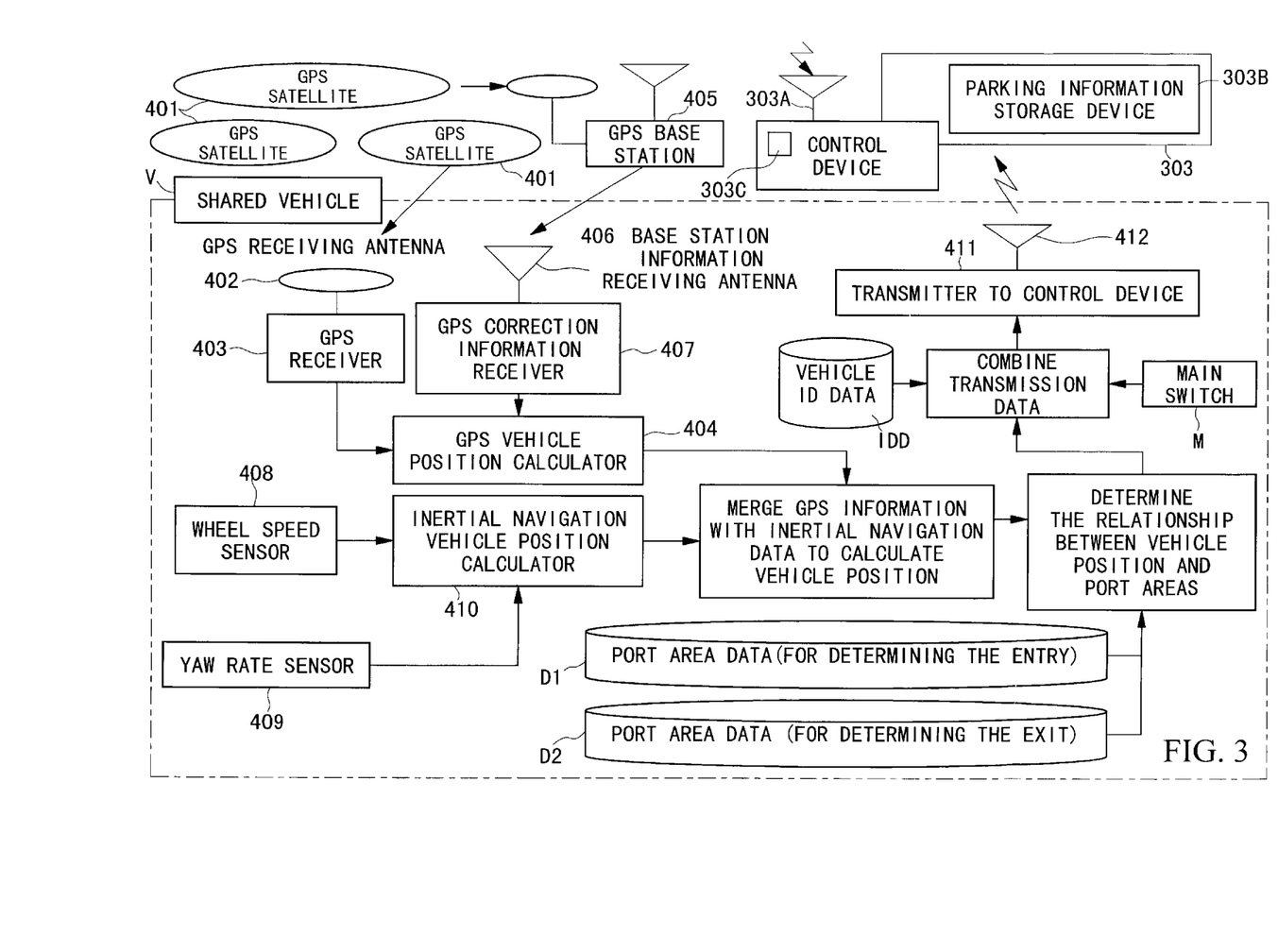
FIG. 3 is a block diagram mainly showing a construction of a vehicle in accordance with the present invention.

Next, the structure of the vehicle of the present invention (enclosed by the chain lines) will be discussed with reference to FIG. 3. A signal from a GPS satellite 401 is received by a GPS receiving antenna 402, and is sent through a GPS receiver 403, and then the position of the target vehicle is calculated by a GPS vehicle position calculator 404. A GPS correction information receiver 407 receives correction information from a GPS base station 405 through a base station information antenna 406, and corrects the signal from the GPS receiver 403 to obtain the correct vehicle position.

The vehicle position calculated by the GPS vehicle position calculator 404 is merged with data which is calculated beforehand by an inertial navigation vehicle position calculator 410 using a wheel speed sensor 408 and yaw rate sensor (azimuth sensor) 409. Then, it is determined whether the calculated vehicle position is within the entrance area 304 and within the exit area 305, based on port area data D1 for judging the entry of the vehicle and on port area data D2 for judging whether the vehicle has exited (D1 and D2 are stored in a memory of the vehicle). The data is expressed by, for example, coordinates (x {north}, y {east}).

When the entrance area 304 and the exit area 305 are identical, and when the vehicle drives in and out of this area, hunting due to hysteresis may arise. The present invention prevents this hunting because the entrance area 304 differs from the exit area 305 as shown in FIG. 2, and prevents troubles when judging the relationship between the vehicle position and the port areas. When the above-mentioned problem does not occur, the entrance area 304 and the exit area 305 may be identical.

The data concerning the relationship between the vehicle position and the port areas is combined with the vehicle ID data IDD, and the combined data is transmitted from the antenna 412 of a transmitter 411 to the control device 303. When combining the data to be transmitted, the information concerning the ON or OFF state of the main switch M of the shared vehicle V is added.

The port area data D1 for judging the entry of the vehicle and the port area data D2 for judging whether the vehicle has exited may not be always separate. For example, the port area data D2 may be set as the reference, and the port area data D1 may be calculated by reducing the reference port area.

The control device 303 has a parking information storage device 303B for storing information of approach, arrival, departure, and rentability of the shared vehicles V (the information will be described with reference to FIG. 8). The vehicle position information may be transmitted to the control device 303 when there is a change in the condition of the shared vehicle V, or when the main switch is turned on or off (which is included in the "change in the condition"), or may be continuously transmitted. Thus, the data may be transmitted in various manners.

Next, the process in the vehicle will be explained with reference to the flowchart of FIG. 4.

In step S20, inertial navigation data is calculated by the integration, based on the data from the wheel speed sensor 408 and the yaw rate sensor 409. Then, in step S21, the GPS vehicle position is calculated from the GPS information and the base station correction information. In step S22, it is determined whether the GPS information is reliable or not. Thus, the data is removed when the GPS satellite is intercepted.

When in step S22 the determination is NO, the flow proceeds to step S24. When in step S22 the determination is YES, the inertial navigation data is corrected, based on the GPS vehicle position data, in step S23.

Then, in step S24, it is determined whether the vehicle position is within or outside the entrance area 304. When in step S24 the vehicle position is not within the entrance area 304, a port approach determination is turned off in step S25, and the flow proceeds to step S30.

When in step S24 the vehicle position is within the entrance area 304, the port approach determination is turned on in step S26, and the flow proceeds to step S27. In step S27, it is determined whether the main switch M of the shared vehicle V is in the ON state or not. When the determination is NO, the flow proceeds to step S28, a port arrival determination is turned on, and the flow proceeds to step S30. When in step S27 the determination is YES, the port arrival determination is turned off in step S29, and the flow proceeds to step S30. Thus, when in step S24 the vehicle position is outside the entrance area, the state of the main switch M is not determined.

In step S30, it is determined whether the vehicle position is within or outside the exit area 305. When the vehicle position is within the exit area 305, the port departure determination is turned on in step S32, and the port approach determination, the port departure determination, the port arrival determination, and the vehicle ID are transmitted to the control device 303, at which point the process is completed in step S33. When in step S30 the vehicle position is not within the exit area 305, the port departure determination is turned off in step S31, and the flow proceeds to step S33.

Figure 5:
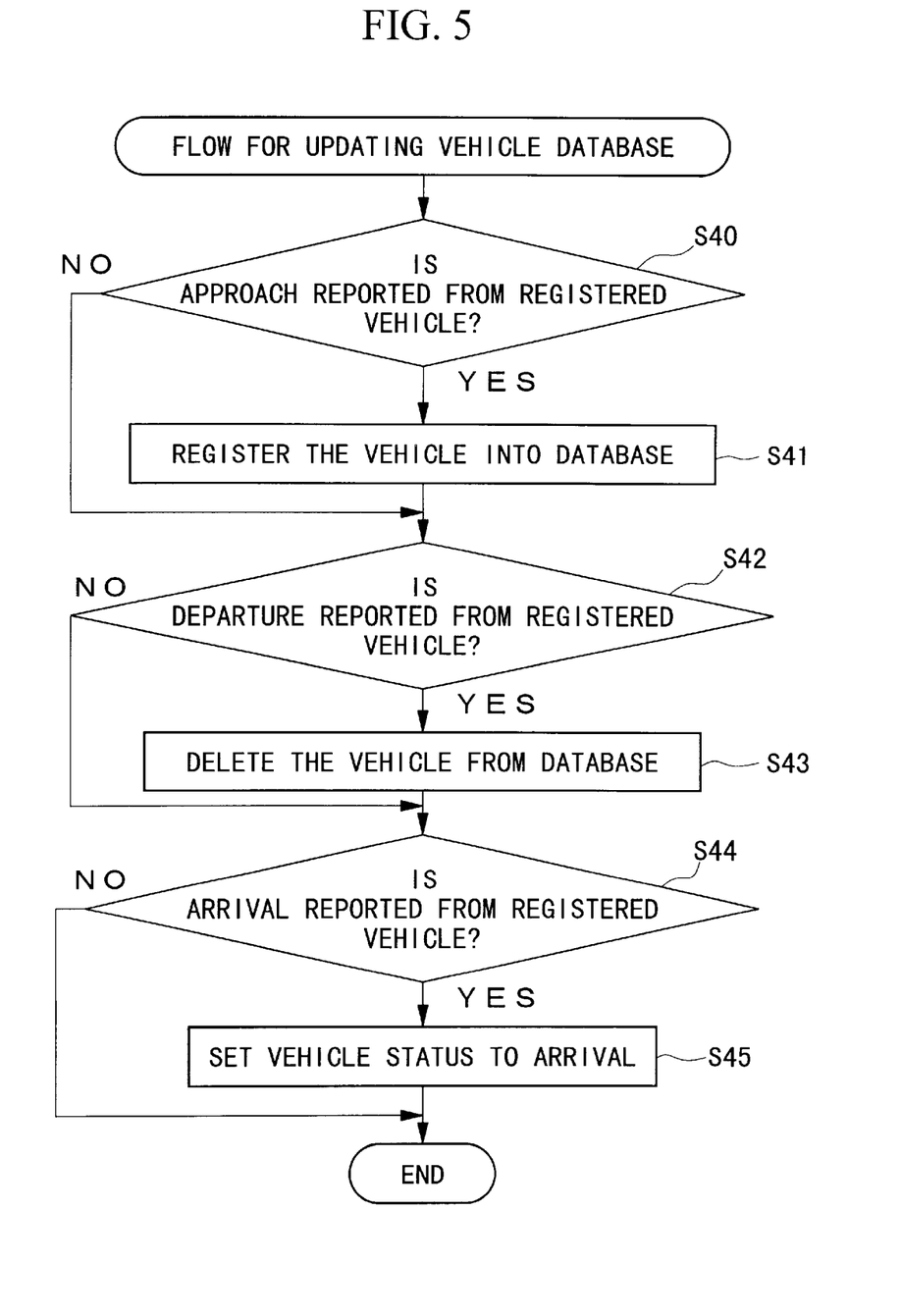
FIG. 5 is a flowchart showing a process for updating a vehicle database in accordance with the present invention.

Next, the process for updating a vehicle database will be explained with reference to the flowchart of FIG. 5. In step S40, it is determined whether an approach is reported from the registered vehicle or not. When an approach is reported, the flow proceeds to step S41, where the database information shown in FIG. 8 is updated by writing the approach of the vehicle with a specified ID number to the port P (status: 1). When in step S40 the approach is not reported, the flow proceeds to step S42. In step S42, it is determined whether the departure is reported from the registered vehicle or not.

When in step S42 the departure is not reported, the flow proceeds to step S44. When in step S42 the departure is reported from the registered vehicle, the database information shown in FIG. 8 is updated in step S43 by writing the departure of the vehicle with the specified ID number (status: 3). Then, the flow proceeds to step S44.

In step S44, it is determined whether the arrival of the vehicle is reported from the registered vehicle, based on the OFF state of the main switch M. When the arrival is reported, the database information shown in FIG. 8 is updated by writing the arrival of the vehicle with the specified ID number at the port P (status: 2) in step S45. When in step S44 the arrival is not reported from the registered vehicle, the process is completed.

The procedure for returning the vehicle will be explained with reference to FIG. 6.

In step S60, it is determined whether the operation at the terminal was correct or not. When the operation was correct, the flow proceeds to step S61, where it is determined whether the operation to the terminal is for returning the vehicle or not. When in step S60 the operation was not correct, the process is completed.

When in step S61 the operation is for returning the vehicle, it is determined in step S62 whether the vehicle reported its arrival. When in step S61 the operation is not for returning the vehicle, the process is completed. When in step S62 the vehicle reported its arrival, the vehicle is made rentable in step S63, and the process is completed. When in step S62 the vehicle did not report its arrival, the process is completed.

Figure 8:
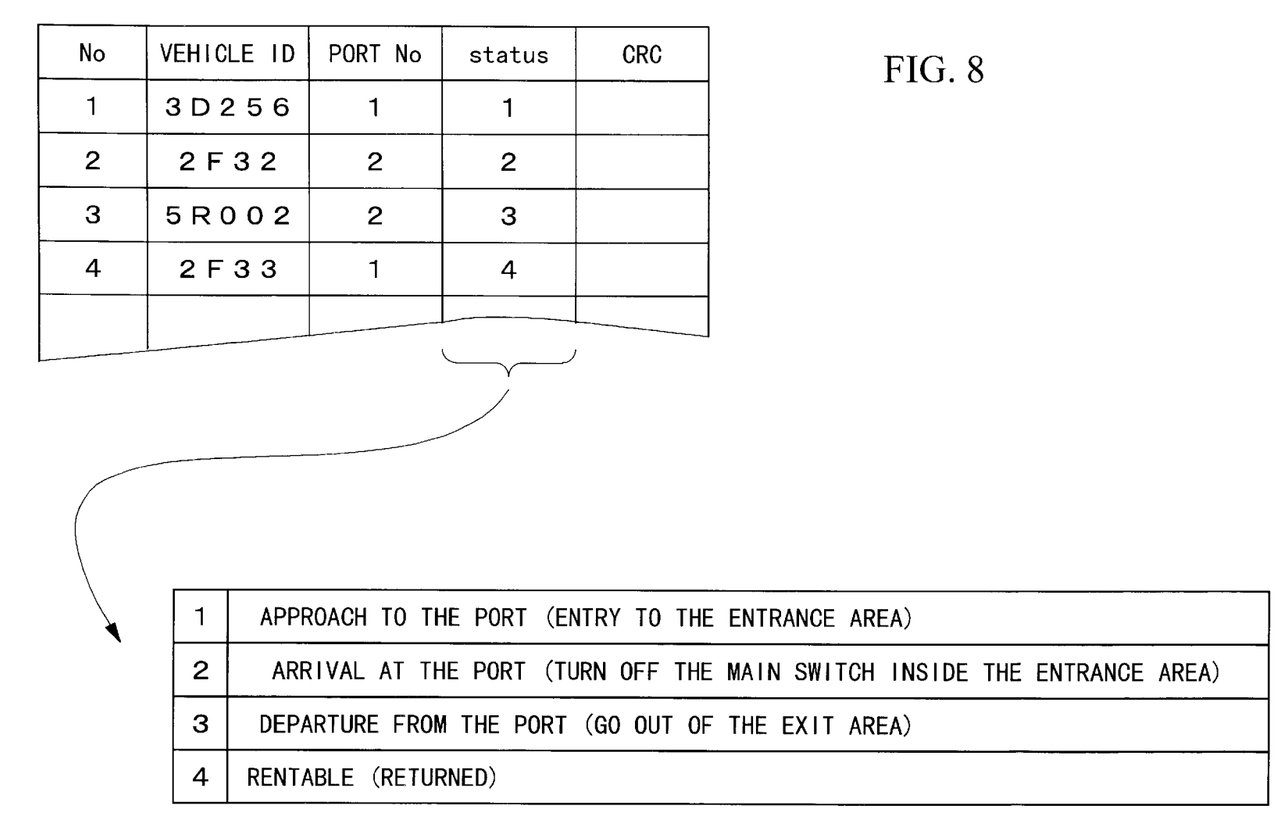
FIG. 8 is a diagram showing parking information used in a first embodiment of the present invention.

When in step S62 the determination is YES, the database information shown in FIG. 8 is updated by writing the completion of the procedure for returning the vehicle with the specified ID number and the availability of the vehicle (status: 4). When in step S62 the determination is NO, that is, when the vehicle is not correctly returned (when step S63 is not conducted), the vehicle is kept in the rented state (in the reserve mode).

Figure 4:
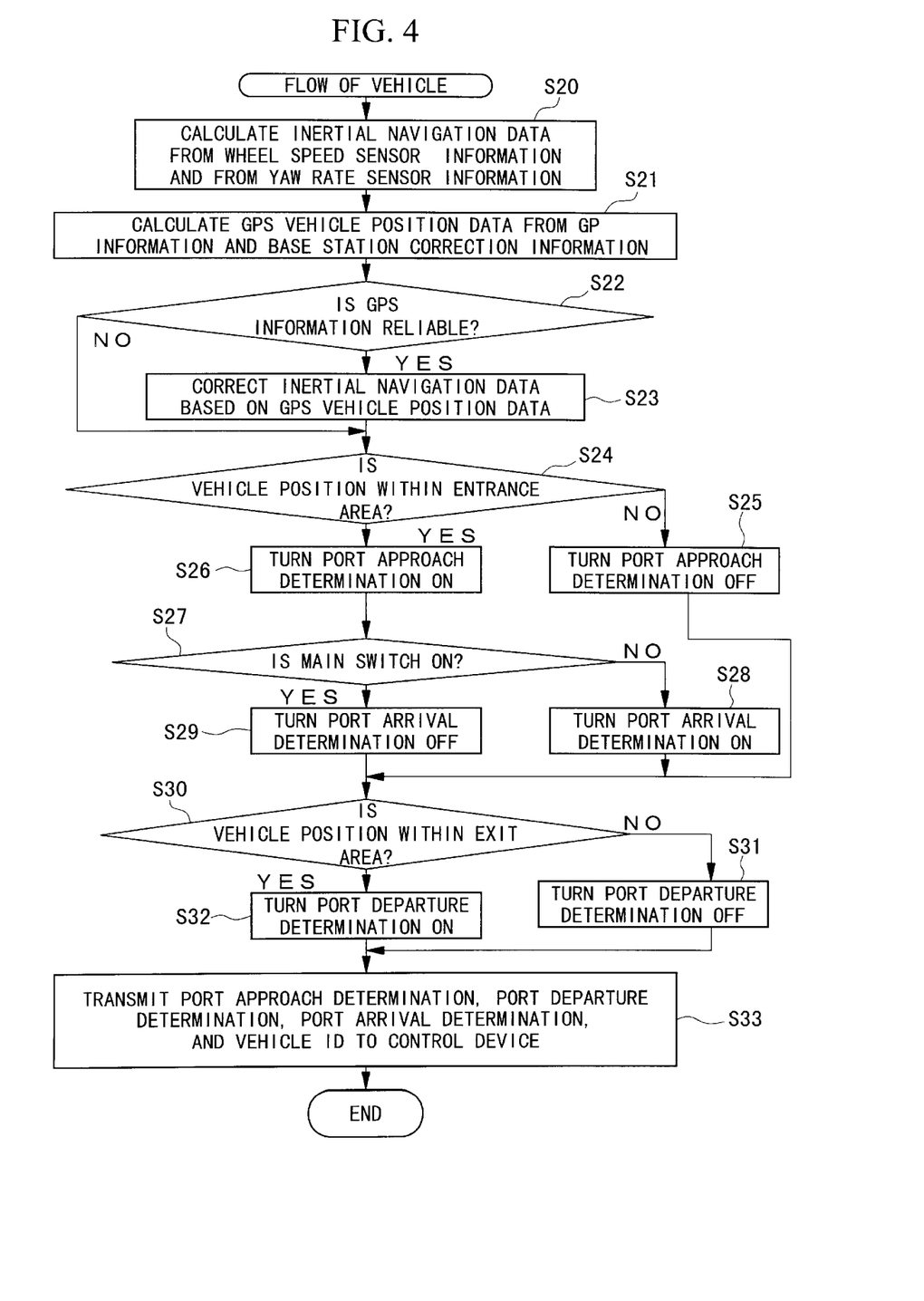
FIG. 4 is a flowchart showing a process carried out in a vehicle in accordance with the present invention.
Figure 6:
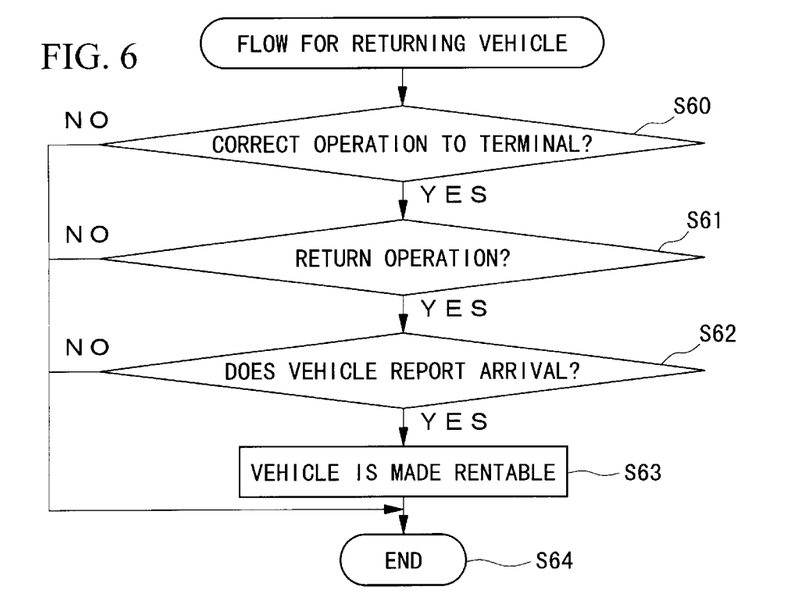
FIG. 6 is a flowchart showing a process for returning a vehicle in accordance with the present invention.

Therefore, when the user leaves the shared vehicle V outside the shared vehicle area K, turns the main switch M off, and has conducted the procedure for returning the vehicle through the control device 303 of the port P, the port approach determination is in the OFF state in step S25 because the determination in step S24 of FIG. 4 is NO, and the determination in step S62 in FIG. 6 is NO. Thus, the shared vehicle V is not rentable even in step S63, and is maintained in the reserve state.

Because the shared vehicle is not returned, the shared vehicle is charged unless the user completes the procedure for returning the vehicle in the shared vehicle area K. When the user parks the shared vehicle outside the shared vehicle area K, turns the main switch M off, and operates the terminal 303C, an announcement may be made to notify the user that the vehicle should be parked in and returned to the port P.

Figure 7:
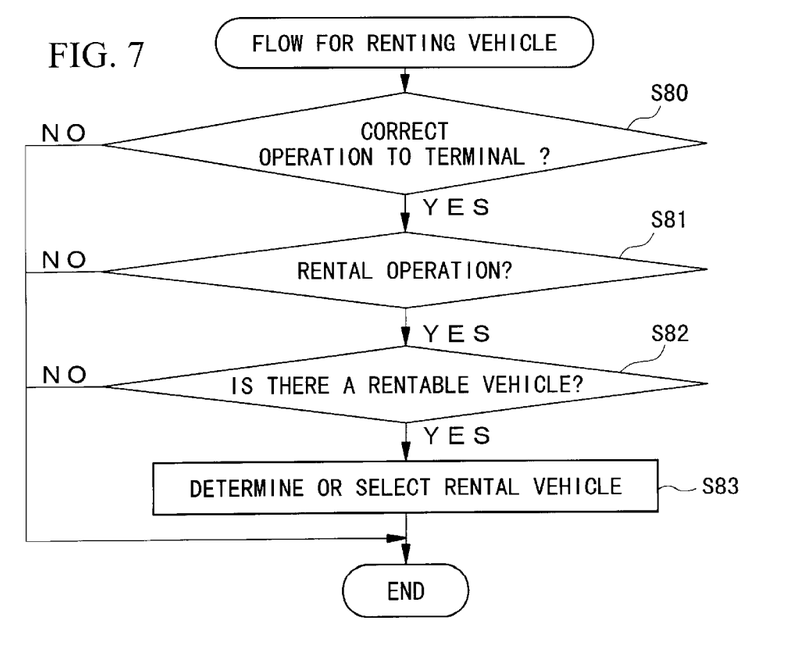
FIG. 7 is a flowchart showing a process for renting a vehicle in accordance with the present invention.

The process for renting the vehicle will be explained with reference to FIG. 7.

In step S80, it is determined whether the operation at the terminal was correct or not. When the operation was correct, the flow proceeds to step S81, where it is determined whether the operation is for renting the vehicle or not. When in step S80 the operation was correct, the process is completed.

When in step S81 the operation is for renting the vehicle, it is determined in step S82 whether there is a rentable vehicle or not. When in step S81 the operation is not for renting the vehicle, the process is completed. When in step S82 there are rentable vehicles, one of the standby vehicles is selected in step S83, and the process is completed. When in step S82 there is no rentable vehicle, the process is completed. When in step S83 the vehicle to be rented is selected among the standby vehicles, the vehicle can be locked and unlocked and can be driven by the dedicated card (card key) used in the operation to the terminal 303C.

The parking information will be explained with reference to FIG. 8.

FIG. 8 shows an example of the parking information. This parking information includes "No.", "vehicle ID", "Port No.", "status", and "CRC." Examples of the status data are:
1: Approach to the Port (enter the entrance area),
2: Arrival at the Port (turn off the main switch inside the entrance area),
3: Departure from the Port (go out of the exit area), and
4: Rentable (returned).

The parking information is stored in the parking information storage device 303B of the control device 303. The CRC is used for a data check function.

Preferably, the data, which includes, e.g., the ON or OFF state of the main switch M, is transmitted when there is a change in the condition of the shared vehicle V from the shared vehicle V to the control device 303.

According to the above embodiment, the shared vehicle V has not been returned unless the user has conducted the procedure for returning the shared vehicle V. Further, when the user parks the shared vehicle V outside the shared vehicle area K (e.g., in the general vehicle area R, or on a road), the return procedure cannot be conducted. This prevents the vehicle from being left outside the shared vehicle area K, and another user can conveniently rent the vehicle.

When the user parks the vehicle in the general vehicle area R and tries to return it by mistake, an announcement may be made to inform the user that the vehicle should be correctly parked in the shared vehicle area K and then the return procedure should be conducted. This prevents a mistaken operation by the user.

Further, the vehicle cannot be rented unless the user completes the rental procedure. Thus, the shared vehicles V can be reliably managed by the port P.

Particularly, the situation of the parked vehicles in the port P can be obtained by communication between the shared vehicle V and the control device 303, and the parking information update device (steps S41, S43, S45, and S62) of the control device 303 always provide the latest parking information. Thus, the entries and exits of the shared vehicles V can be reliably managed.

In contrast with the port dedicated to the shared vehicles V, the present invention provides the port P in which the shared vehicles V and the general vehicles IV can be parked in a mixed manner, and thus improves the efficiency in the use of the parking lot, especially in a growing urban area where the parking space is restricted, as compared with the port dedicated to the shared vehicle V.

The general vehicle IV, which is parked in the port P, has not been returned to the port P until the user finishes his task even after parking of the vehicle. In contrast, the user drives the shared vehicle V to the port P, and once the return procedure is completed in the port P, the shared vehicle V can be rented by another user. This significantly differs from the case of the general vehicle IV.

Depending on the circumstances, the port P may sometimes has no rentable shared vehicle V. When the port P is dedicated to the shared vehicles, the efficiency in the use of the port P may be decreased, depending on the condition of the vehicle utilization.

In this invention, the existing parking lot for the general vehicles also serves as the port P for the shared vehicles, thereby reducing the costs for the construction of the system. Even when an existing paid parking lot for the general vehicles is utilized as the port P, the returned shared vehicles V are not charged, and thus various management methods are possible. Because the present invention determines, based on the position of the shared vehicle V, whether the vehicle is within or outside the parking lot, the general vehicles IV do not affect the management of the shared vehicles V, and the general vehicles IV and the shared vehicles V can be parked in a mixed manner.

Once the shared vehicle V is returned to the port P, the control of the shared vehicle V is switched from the occupant to the system, and the switching point of the control is recognizable. Thus, the present invention has merit where the rental and return operations also times the switching of the control of the shared vehicle in the system.

The second embodiment of the present invention will be explained with reference to FIG. 9. In the second embodiment, reference numerals which are identical to the first embodiment, respectively, indicate elements which are identical to those of the first embodiment.

Figure 9:
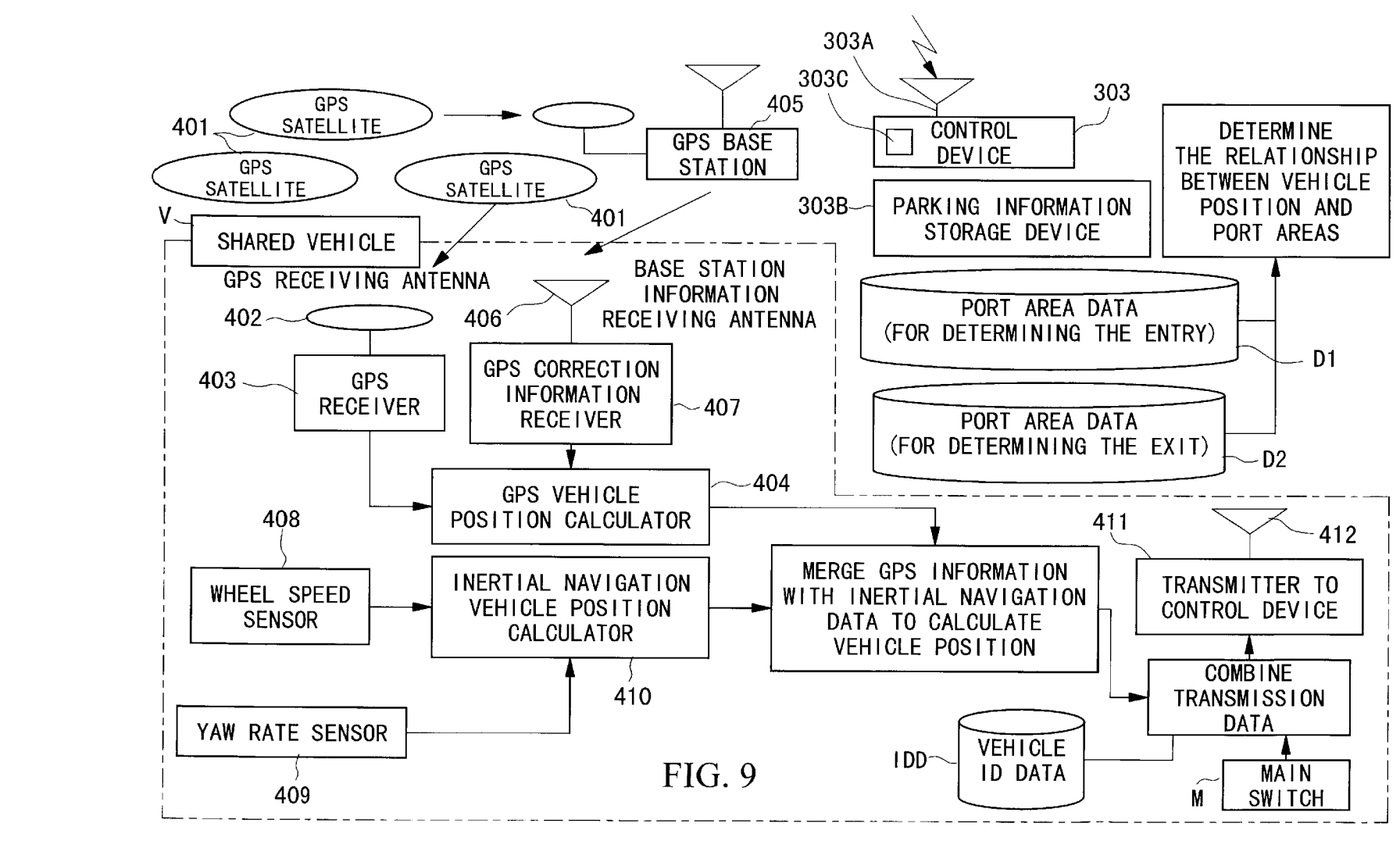
FIG. 9 is a block diagram showing a shared vehicle and a control device in accordance with the present invention.

FIG. 9 is a block diagram showing the construction of the shared vehicle V and a control the device 303. While in the first embodiment the shared vehicle determines whether the vehicle is within or outside the entrance area or the exit area, in the second embodiment the shared vehicle only detects its position, and the control device makes the determination.

The construction of the shared vehicle V will now be explained. In the shared vehicle, a signal from a GPS satellite 401 is received by a GPS receiving antenna 402, and is sent through a GPS receiver 403, and the GPS vehicle position calculator 404 calculates the position of the vehicle. A GPS correction information receiver 407 receives correction information from a GPS base station 405 through a base station information antenna 406, and corrects the signal from the GPS receiver 403 to obtain the correct vehicle position.

The vehicle position calculated by the GPS vehicle position calculator 404 is merged with data which is calculated beforehand by an inertial navigation vehicle position calculator 410 using a wheel speed sensor 408 and yaw rate sensor (azimuth sensor) 409. The vehicle position data is combined with the vehicle ID data IDD, and the combined data is transmitted from the antenna 412 of a transmitter 411 to the control device 303. When combining the data to be transmitted, the information concerning the ON or OFF state of the main switch M of the shared vehicle V is added.

Next, the construction of the control device 303 will be explained. The control device 303 receives the vehicle position information, transmitted from the shared vehicle V, through an antenna 303A. The control device 303 compares the position of the shared vehicle V with the entrance area 304 or the exit area 305 obtained from port area data D1 for determining the entry of the vehicle and from port area data D2 for determining whether the vehicle has exited (D1 and D2 are stored beforehand in a memory of the control device), and then determines whether the shared vehicle V is within or outside these areas. The data is expressed by, for example, coordinates (x {north}, y {east}).

Figure 10:
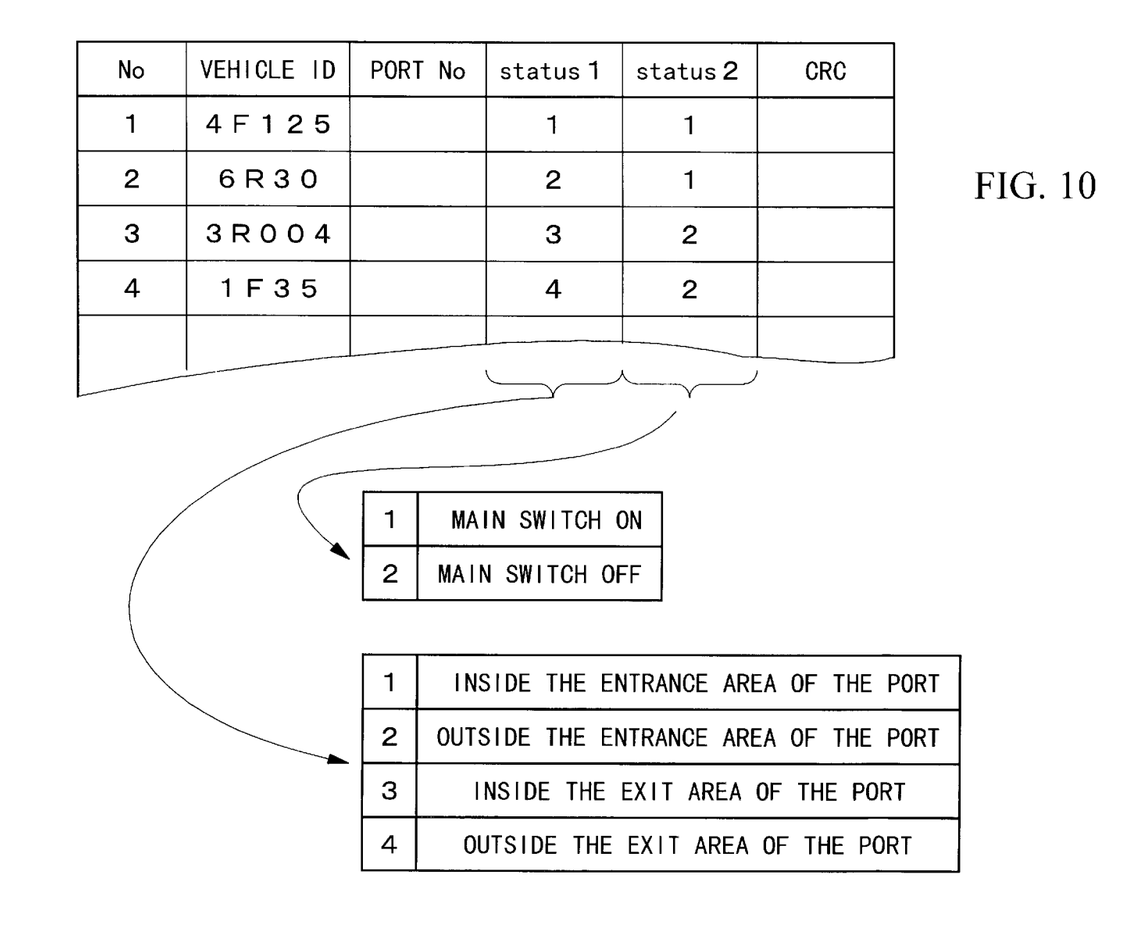
FIG. 10 is a diagram showing parking information used in the second embodiment of the present invention.

The control device 303 has a parking information storage device 303B, which stores data such as "the main switch of the shared vehicle V is ON", "the main switch is OFF", "the shared vehicle V is within the entrance area of the port", "the shared vehicle V is outside the entrance area of the port", "the shared vehicle is within the exit area of the port", and "the shared vehicle is outside the exit area" (which is the parking information shown in FIG. 10).

The port area data D1 for judging the entry of the vehicle and the port area data D2 for judging whether the vehicle has exited may not be always separated. For example, the port area data D2 may be set as the reference, and the port area data D1 may be calculated by expanding the reference port area.

FIG. 10 shows an example of the parking information in the second embodiment. This parking information includes "No.", "vehicle ID", "Port No.", "status 1", "status 2", and "CRC." Examples of the data of "status 2" are:
  1: Main Switch ON, and
  2: Main Switch OFF.

Examples of the data of "status 1 are:
  1: Inside the Entrance Area of the Port,
  2: Outside the Entrance Area of the Port,
  3: Inside the Exit Area of the Port, and
  4: Outside the Exit Area of the Port.

In a manner similar to that of the first embodiment, the vehicle position information may be transmitted to the control device 303 when there is a change in the condition of the shared vehicle V, or when the main switch M is turned on or off (which is included in the "change in the condition"), and may be continuously transmitted. Thus, the data may be transmitted in various manners.

In this embodiment, the control device 303 stores the port area data D1 for determining the entry of the vehicle and the port area data D2 for judging whether the vehicle has exited, and has the function of determining the entry or exit of the vehicle into or from the areas. Therefore, in contrast to the case in which the data and the function are given to the shared vehicle V, the second embodiment simplifies reading and writing of data, and reduces the labor of inputting the data into the respective shared vehicles V.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. An apparatus for managing the entry and exit of a shared vehicle, comprising:
    vehicle position detector provided in said shared vehicle;
    position determining device for determining whether the position of said shared vehicle is within an entrance area of a parking lot, based on the vehicle position information provided by said vehicle position detector;
    arrival determining device for determining whether a main switch of said shared vehicle has been turned off within the entrance area;
    return operation determining device for determining whether a user of said vehicle has conducted a return operation using a terminal for conducting rental and return operations; and
    return determining device for confirming the return of said shared vehicle when said arrival determining device determines that the main switch has been turned off within the entrance area and when said return operation determining device has determined that the return operation has been conducted.

2. An apparatus for managing the entry and exit of a shared vehicle, comprising:
    vehicle position detector provided in said shared vehicle;
    position determining device for determining whether the position of said shared vehicle is within an entrance area of a parking lot or within an exit area of the parking lot, based on the vehicle position information provided by said vehicle position detector;
    arrival determining device for determining whether a main switch of said shared vehicle has been turned off within the entrance area;
    departure determining device for determining whether said shared vehicle drives out of the exit area;
    return operation determining device for determining whether a user of said vehicle has conducted a return operation using a terminal for conducting rental and return operations;

rental operation determining device for determining whether the user has conducted a rental operation through said terminal;

return determining device for confirming the return of said shared vehicle when said arrival determining device determines that the main switch has been turned off within the entrance area and when said return operation determining device has determined that the return operation has been conducted; and rental determining device for accepting rental of said shared vehicle when said departure determining device determines that said shared vehicle drives out of the exit area and when said rental operation determining device determines that the rental operation has been conducted.

3. An apparatus for managing the entry and exit of a shared vehicle, comprising a shared vehicle and control device, wherein:

said shared vehicle comprises:
vehicle position detector;
area storage device for storing entrance area data and exit area data of a parking lot;
approach notifying device for notifying said control device through a communicator that said shared vehicle is going the entrance area;
departure notifying device for notifying said control device through said communicator that said shared vehicle is driving out of the exit area; and
arrival notifying device for notifying said control device through said communicator that a main switch of said shared vehicle has been turned off within the entrance area, and said control device comprises:
terminal for conducting rental and return operations for said shared vehicle;
communicator for receiving the approach notification, the departure notification, and the arrival notification;
storage device for storing the parking information of said shared vehicle;
parking information updating device for updating the parking information, based on the approach notification, the departure notification, the arrival notification, and the rental and return operations; and
controller for controlling rental and returning of said shared vehicle, based on the updated parking information.

4. An apparatus for managing the entry and exit of a shared vehicle, comprising a shared vehicle and control device, wherein said shared vehicle comprises:
vehicle position detector; and
communicator for sending vehicle position information provided by said vehicle position detector and ON/OFF information of the main switch of said shared vehicle to said control device, and said control device comprises:
terminal for conducting rental and return operations for said shared vehicle;
area storage device for storing entrance area data and exit area data of a parking lot;
parking information storage device for storing parking information of said shared vehicle, based on the vehicle position information, and the ON/OFF information of the main switch, which are sent from said vehicle, and on the information from said area storage device;
parking information updating device for updating the parking information, based on the rental and return operations through said terminal; and controller for controlling rental and returning of said vehicle, based on the updated parking information.

5. A system for managing a fleet of shared vehicles and a shared vehicle facility, comprising:

a vehicle position detector on each vehicle in the fleet;
a vehicle status sensor on each vehicle and configured to sense a status of a switch on the vehicle;
a vehicle data transmitter on each vehicle and coupled to said vehicle position detector and to said vehicle status sensor;
a user interface terminal located in the shared vehicle facility configured to perform a vehicle return operation; and
a computer system coupled to said user interface terminal, in communication with said vehicle data transmitter, and configured to confirm a return state of a vehicle in response to the vehicle within a first designated area of the facility, the switch on the vehicle in an off state, and said vehicle return operation for the vehicle.

6. The system of claim 5, wherein:
said user interface is further configured to perform a vehicle renting operation; and
said computer system is further configured to allocate a vehicle in the return state in response to the vehicle renting operation.

7. The system of claim 5, wherein said computer system is further configured to confirm a renting state of a vehicle in response to said vehicle position detector detecting a position of the vehicle outside a second designated area.

8. The system of claim 5, wherein said computer system is further configured to confirm an approaching state of a vehicle in response to said vehicle positions detector detecting the position of the vehicle inside the first designated area and said vehicle status sensor sensing the switch on the vehicle in an on state.

9. The system of claim 5, wherein said computer system is further configured to confirm an arrival state of a vehicle in response to said vehicle positions detector detecting the position of the vehicle inside the first designated area and said vehicle status sensor sensing the switch on the vehicle in the off state.

10. The system of claim 5, wherein said vehicle position detector includes:
a global positioning system (GPS) receiver;
a GPS vehicle position calculator coupled to said GPS receiver; and
a vehicle position data processor coupled to said GPS vehicle position calculator.

11. The system of claim 10, wherein said vehicle position detector further includes a GPS correction information receiver communicating with a terrestrial GPS base station and coupled to said GPS vehicle position calculator.

12. The system of claim 10, wherein said vehicle position detector further includes:
a vehicle motion sensor; and
an inertia vehicle position calculator coupled to said vehicle motion sensor and to said vehicle position data processor.

13. The system of claim 10, wherein said vehicle position detector further includes:
a facility area database; and
a vehicle area data calculator coupled to said facility area database and to said vehicle position data processor.

14. The system of claim 5, wherein said computer system further includes:
a facility area database; and
a vehicle area data calculator coupled to said facility area database.

15. A method for managing a shared vehicle facility, comprising the steps of:
   detecting a position of a vehicle in a fleet of shared vehicles;
   detecting a state of a main switch on the vehicle;
   transmitting a position data regarding the position of the vehicle and a state data regarding the state of the main switch of the vehicle to a control device;
   in response to the position of the vehicle outside a first designated area, confirming an departure state of the vehicle;
   in response to the position of the vehicle in a second designated area, the main switch in a on position, confirming an approach state of the vehicle;
   in response to the position of the vehicle in the second designated area and the main switch in a off position, confirming an arrival state of the vehicle; and
   in response to the position of the vehicle in the second designated area, the main switch in the off position, and a return operation at the control device, confining a return state of the vehicle.

16. The method of claim 15, further comprising the step of, in response to a vehicle renting operation at the control device, allocating a vehicle in the return state.

17. The method of claim 15, wherein the step of detecting a position of a vehicle includes the step of calculating the position of the vehicle using a global positioning system (GPS) signal received through a GPS receiver on the vehicle.

18. The method of claim 17, wherein the step of calculating the position of the vehicle includes calculating the position of the vehicle further using a terrestrial GPS base station signal.

19. The method of claim 17, wherein the step of calculating the position of the vehicle includes calculating the position of the vehicle further using an inertia vehicle navigation signal.

20. The method of claim 15, further comprising the step of identifying each vehicle in the fleet with a vehicle identification number.

21. A system for managing a shared vehicle, comprising:
   a vehicle location detector on the shared vehicle;
   a vehicle status sensor on the shared vehicle;
   a user interface terminal configured to perform a vehicle return operation; and
   a computer system configured to receive data from said vehicle location detector, said vehicle status sensor and said user interface terminal and further configured to confirm a return state of a vehicle in response to a vehicle location within a first designated area, a vehicle status in a first predetermined state, and an occurrence of the vehicle return operation.

22. The system of claim 21, wherein:
   said user interface is further configured to perform a vehicle renting operation; and
   said computer system is further configured to allocate the shared vehicle in response to the vehicle renting operation and the shared vehicle in the return state.

23. The system of claim 21, wherein said computer system is further configured to confirm a renting state of the shared vehicle in response to the vehicle location outside a second designated area.

24. The system of claim 21, wherein said computer system is further configured to confirm an approaching state of the shared vehicle in response to the vehicle location within the first designated area and the vehicle status in a second predetermined state.

25. The system of claim 21, wherein said computer system is further configured to confirm an arrival state of the shared vehicle in response to the vehicle location within the first designated area and the vehicle status in the first predetermined state.

26. The system of claim 21, wherein said vehicle location detector includes:
   a global positioning system (GPS) receiver;
   a GPS vehicle position calculator coupled to said GPS receiver; and
   a vehicle location data processor coupled to said GPS vehicle position calculator.

27. The system of claim 26, wherein said vehicle location detector further includes a GPS correction information receiver communicating with a terrestrial GPS base station and coupled to said GPS vehicle location calculator.

28. The system of claim 26, wherein said vehicle location detector further includes:
   a vehicle motion sensor; and
   an inertia vehicle position calculator coupled to said vehicle motion sensor and to said vehicle location data processor.

29. The system of claim 26, wherein said vehicle location detector further includes:
   a facility area database; and
   a vehicle area data calculator coupled to said facility area database and to said vehicle location data processor.

30. The system of claim 21, wherein said computer system further includes:
   a facility area database; and
   a vehicle area data calculator coupled to said facility area database.

31. A method for managing a shared vehicle facility, comprising the steps of:
   detecting a location of a shared vehicle;
   detecting a status of the shared vehicle;
   in response to the location of the shared vehicle outside a first designated area, confirming a departure state of the shared vehicle;
   in response to the location of the shared vehicle in a second designated area, the status of the shared vehicle in a first predetermined state, confirming an approach state of the shared vehicle;
   in response to the location of the shared vehicle in the second designated area and the status of the shared vehicle in a second predetermined state, confirming an arrival state of the shared vehicle; and
   in response to the location of the shared vehicle in the second designated area, the status of the shared vehicle in the second predetermined state, and a return operation at a control device, confirming a return state of the shared vehicle.

32. The method of claim 31, further comprising the step of, in response to a vehicle renting operation at the control device and the shared vehicle in the return state, allocating the shared vehicle.

33. The method of claim 31, wherein the step of detecting a location of a shared vehicle includes the step of calculating the location of the shared vehicle using a global positioning system (GPS) signal received through a GPS receiver on the shared vehicle.

34. The method of claim 33, wherein the step of calculating the location of the shared vehicle includes calculating the location of the shared vehicle further using a terrestrial GPS base station signal.

35. The method of claim 33, wherein the step of calculating the location of the shared vehicle includes calculating the location of the shared vehicle further using an inertia vehicle navigation signal.

* * * * *